(12) United States Patent
Zeliff et al.

(10) Patent No.: US 8,866,798 B2
(45) Date of Patent: Oct. 21, 2014

(54) CAPACITIVE STYLUS WITH DISC TIP

(75) Inventors: Zachary Joseph Zeliff, Taipei (TW); Yueh-Hua Li, Zhudong Township, Hsinchu County (TW); Chia-Yeh Kung, Taipei (TW); Kristopher James Perpich, Seattle, WA (US); Kuang-Yuan Tsai, Taipei (TW); Kevin S. Smith, Taipei (TW)

(73) Assignee: Adonit Co. Ltd., Taipei (TW)

( * ) Notice: Subject to any disclaimer, the term of this patent is extended or adjusted under 35 U.S.C. 154(b) by 0 days.

(21) Appl. No.: 13/237,974

(22) Filed: Nov. 9, 2011

(65) Prior Publication Data

US 2012/0327044 A1 Dec. 27, 2012

(51) Int. Cl.
*G06F 3/033* (2013.01)
*G06F 3/044* (2006.01)
*G06F 3/0354* (2013.01)

(52) U.S. Cl.
CPC ............ *G06F 3/03545* (2013.01); *G06F 3/044* (2013.01)
USPC .......................................................... 345/179

(58) Field of Classification Search
USPC .......................................................... 345/179
See application file for complete search history.

(56) References Cited

U.S. PATENT DOCUMENTS

| 8,139,047 B2 * | 3/2012 | Ringholz et al. .............. 345/176 |
| 2006/0007186 A1 * | 1/2006 | Homer et al. .................. 345/179 |
| 2012/0327046 A1 * | 12/2012 | Sung .............................. 345/179 |

* cited by examiner

*Primary Examiner* — David D Davis

(57) ABSTRACT

A stylus assembly for a capacitive touch screen provides input via conventional handwriting action. A stylus is attached at a contact end to a disc providing ample capacitive proximity with the touch screen. A layer of capacitive material is embedded within the disc, and may be formed with a distinct shape, layout, or outline to provide a uniquely recognizable capacitive signature. The stylus terminates at the contact end in a received portion, attached to the disc by a receiving portion formed thereon. Free rotation of the received portion within the receiving portion accepts positioning of the stylus body at any angle with no degradation of capacitive proximity, allowing natural handwriting action. The receiving portion can be formed with sufficient flexibility to allow disengagement and re-engagement thereof, enabling simple and low-cost replacement of the disc.

5 Claims, 3 Drawing Sheets

CAPACITIVE STYLUS WITH DISC TIP

BACKGROUND OF THE INVENTION

1. Field of the Disclosure

The disclosure relates to computer accessories, and more specifically, to a stylus assembly providing input to a capacitive touch screen.

2. Description of the Related Art

Capacitive touch screens are widely used for device input, providing a more natural and user-friendly means of interaction. Input by way of a stylus has long been available, with the attendant replication of conventional handwriting offering a familiar input experience. Such applications, however, often require the touch screen capacitance to be configured specifically to accept input through a contact area corresponding to the end of the stylus.

With recent innovations in functionality and application development, capacitive touch screens are experiencing a dramatic surge in popularity. A significant number of these, however, are configured for input by a user's fingertip, for convenience. A limitation arises accordingly for users preferring stylus input or applications requiring the same.

One solution provides a stylus terminating in a contact portion of a size approximating the contact area of a user's fingertip, thereby meeting the capacitive requirement of the touch screen. The excessive size requirement of the stylus, however, seriously detracts from an input experience replicating conventional handwriting.

Yet another solution provides a stylus assembly in which a conventional stylus terminates at a conventionally sized contact end attached to a disc of capacitive material. The disc comprises sufficient capacitive proximity to implement functional input to the touch screen configured for fingertip use. However, the stylus attaches to the disc at a fixed angle, often perpendicular on two axes to the touch screen surface. Alternatively, the stylus may be attached to the disc whereby the angle of the stylus is variable, but configured with resilient members attached thereto such that elastic force returns the stylus to a perpendicular attitude. Inability of the assembly to provide an angle suited to the individual user impairs ease and familiarity of use by failing to fully replicate a preferred and familiar handwriting experience. Constant wear on the disc further necessitates replacement of the entire assembly with regular use, a costly and inconvenient requirement. As well, capacitive capability of the disc is provided by capacitive metal particles suspended within the disc material. With regular use, the disc material can wear away, in which case the embedded particles are exposed, incurring damage on the capacitive surface, especially when supplementary protective layers have been deployed thereon, and impairing smooth interaction of the stylus with the capacitive surface. Also, the particles may be released from the disc material, incurring further damage to the capacitive surface, sullying the environment, and reducing capacitive capability of the device.

An additional limitation occurs as a result of the stylus body's disposition perpendicular to the disc, in which maintenance of a parallel relationship between the disc and capacitive surface is extremely difficult. This variation causes inconsistency in the level of capacitance, and, correspondingly, effective delivery of input.

Finally, suspension of the capacitive particles in the disc material prevents the input detection system from differentiating between input by the disc-equipped stylus and other means.

Thus, what is called for is an input system for a capacitive touch screen addressing the limitations described.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
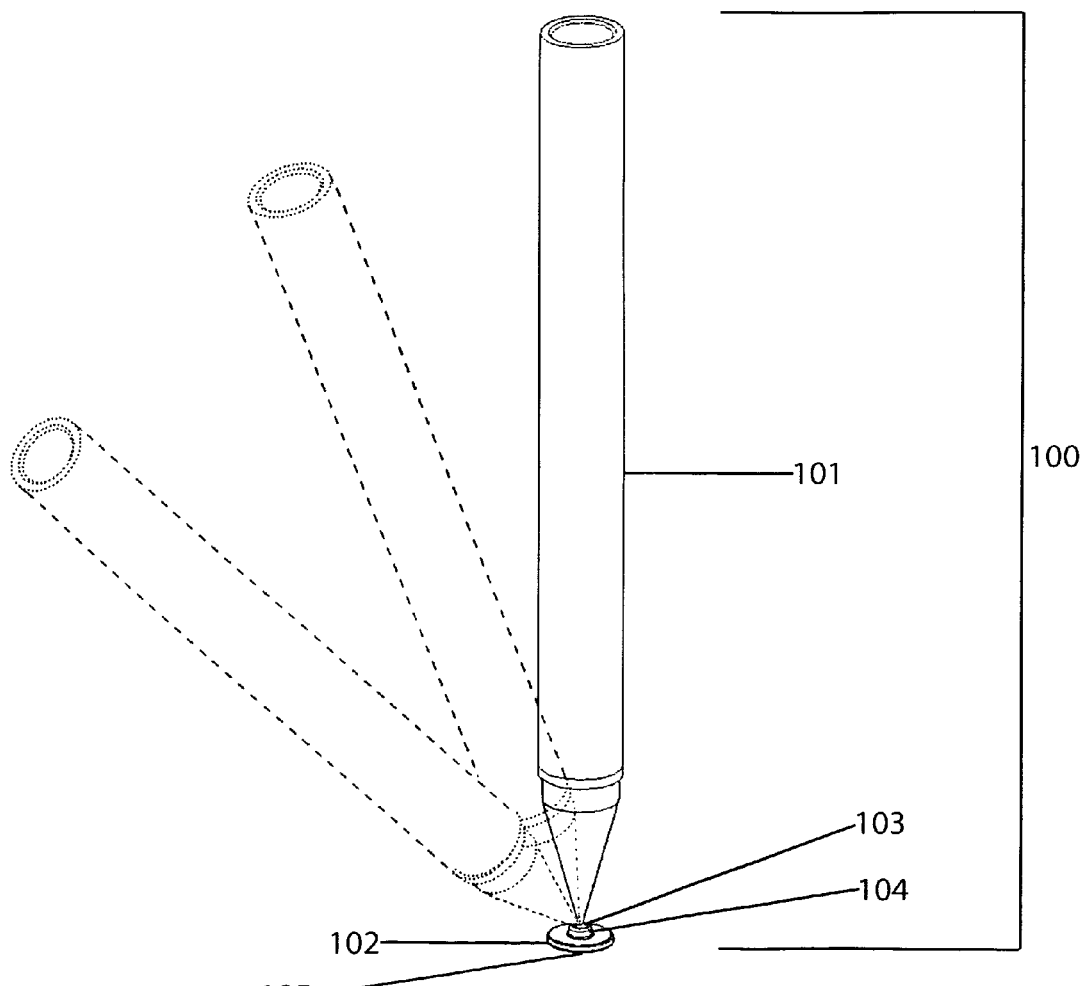
FIG. 1 is a side view of a stylus assembly for a capacitive touch screen as disclosed, with the stylus movable, as shown by dotted arrows, through a wide range of angles while capacitive proximity is maintained between the touch screen surface and a proximal face of a disc component of the stylus assembly

As shown in FIG. 1, a stylus assembly 100 for a capacitive touch screen as disclosed comprises a stylus component 101, connected to a disc component 102 by a received portion 103 of the stylus component 101 received in a receiving portion 104 of the disc component 102, formed opposite to a proximal face 105 of the disc component 102. The receiving portion 104, while securing the received portion 103 of the stylus component 101 therein, allows free rotation thereof through all angles with the touch screen surface (not shown), as shown by dotted arrows, while capacitive proximity is maintained between the touch screen surface and the proximal face 105 of the disc component 102. The stylus component 101 can be of any conventional construction, providing conduction from the user to allow capacitive action with the touch screen surface, as is well known in the art. The disc component 102 may further be transparent, allowing data displayed on the touch screen surface to be viewed irrespective of the position of the disc component 102. The disc component 102 can comprise a capacitive material layer within the disc component. In embodiments in which the disc component exhibits transparency, the capacitive material is of sufficient thinness and composition to be equally transparent. Alternatively, the capacitive material layer can be metallic, such as steel, or any other material providing a desired degree of capacitance. In some embodiments, the capacitive material layer can further be formed with a distinct shape, layout, or outline, such as, for example, a cross-shape, diamond, or in concentric circles, such that a unique capacitive signature is generated. It should be noted that such configurations as disclosed are exemplary only, and not intended to limit the scope of the disclosure thereto.

Figure 2:
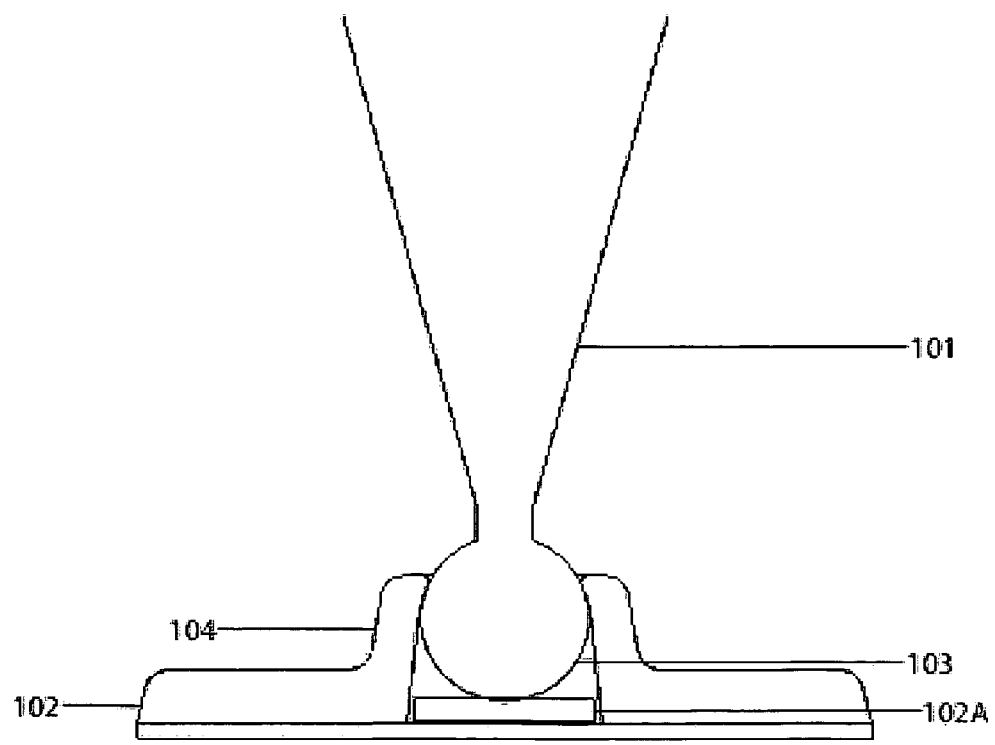
FIG. 2 is a cross section of an embodiment of a stylus assembly for a capacitive touch screen as disclosed, showing a capacitive material layer within the disc component, and in which a received portion of the stylus component is configured in a spherical termination, the received portion received in a receiving portion, configured in this embodiment as a socket

FIG. 2 is a cross section of an embodiment of a stylus assembly 100 for a capacitive touch screen as disclosed, showing capacitive material layer 102A within the disc component, and in which a received portion 103 of the stylus component 101 is configured in a spherical termination, received in a receiving portion 104, configured in this embodiment as a socket. In this embodiment, circumference of the socket at an upper open end is exceeded by circumference thereof closer to the disc component 102, such that the received portion is secured in the receiving portion while free to rotate therein through a wide range of angles with the touch screen surface (not shown). Natural handwriting action is thus provided.

Figure 3:
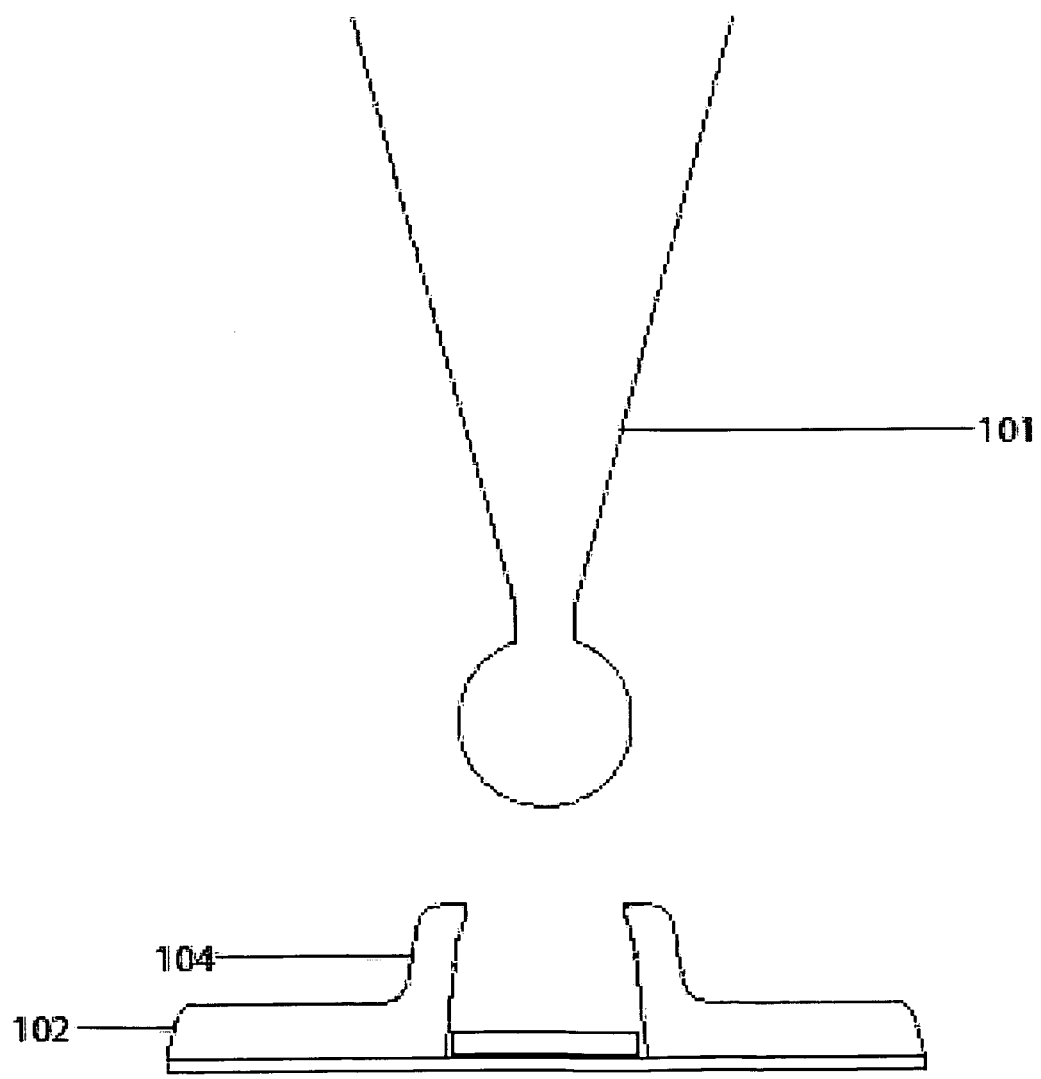
FIG. 3 shows the embodiment of a stylus assembly for a capacitive touch screen of FIG. 2, with the stylus thereof disengaged from the disc component

FIG. 3 shows the embodiment of a stylus assembly for a capacitive touch screen of FIG. 2, with the stylus component 101 thereof disengaged from the disc component 102. As can be seen, concentricity of the receiving portion 104, while securing the received portion 103 therein, also allows the stylus component 101 to be disengaged therefrom, with application of minimal force. Similarly, the stylus component 101 can be re-engaged with the disc component 102 with application of minimal force in the opposite direction.

It should be noted that, while, in the illustrated embodiment, the received portion 103 and receiving portion 104 are configured in a ball-and-socket form, respectively, the disclosure is not limited thereto, and the received portion 103 and receiving portion 104 can follow any configuration allowing the former to be secured within the latter while remaining rotatable through a wide range of angles with the touch screen surface (not shown) and permitting simple disengagement and re-engagement thereof, remaining equally applicable and well within the scope of the disclosure.

The stylus assembly for a capacitive touch screen as disclosed allows fully functional capacitive response when applied with a touch screen configured for fingertip input, while providing a familiar and user-friendly replication of conventional handwriting action. Wear of the stylus assembly incurs no degradation of capacitive material thereof. Further, the effects of prolonged use are incumbent upon only the easily disengaged and re-engaged disc component, replacement of which is considerably less costly and troublesome than that of the entire stylus assembly. As well, variation of the angle of the stylus component promotes a more consistently parallel disposition of the proximal face thereof with the capacitive surface, thereby assuring more consistently robust capacitance therebetween, and, correspondingly, more effective data input. Finally, when the capacitive material layer is deployed with a distinctive shape or profile, the system can recognize the capacitive signature thereof and register an input configuration unique thereto. Such recognition can allow the stylus assembly as disclosed to be used simultaneously with finger input, or with other distinctly recognized stylus assemblies. In further aid thereof, the stylus assembly as disclosed allows a variety of disc components to be used, each with uniquely configured input characteristics, simply and at minimal cost, since only the disc components need be acquired, all being usable with a single stylus assembly.

While the disclosure has been described by way of example and in terms of preferred embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A stylus assembly for a capacitive touch screen, the stylus assembly comprising:
    a stylus component connected to a disc component, wherein
    the disc component comprises a capacitive material layer embedded therein of sufficiently capacitive material to provide capacitance between a proximal face thereof and the touch screen;
    the proximal face of the disc component maintains proximity with a surface of the touch screen, providing capacitance therewith;
    the stylus component is connected to the disc component by a received portion on the stylus component received in a receiving portion formed on the disc component opposite to the proximal face;
    the receiving portion, while securing the received portion of the stylus component therein, allows free rotation thereof through multiple angles with the touch screen surface, while capacitive proximity is maintained between the touch screen surface and the proximal face of the disc component; and
    wherein the receiving portion, while securing the received portion of the stylus component therein and allowing free rotation thereof through multiple angles with the touch screen surface while capacitive proximity is maintained between the touch screen surface and the proximal face of the disc component, allows disengagement therefrom and re-engagement therewith of the received portion of the stylus component.

2. The stylus assembly for a capacitive touch screen of claim 1, wherein the stylus component provides conduction from the user to allow capacitive action with the touch screen surface.

3. The stylus assembly for a capacitive touch screen of claim 1, wherein the capacitive material layer is formed with a distinct shape, layout, or outline.

4. The stylus assembly for a capacitive touch screen of claim 1, wherein the disc component is transparent.

5. The stylus assembly for a capacitive touch screen of claim 4, in which capacitive material within the disc component is of sufficient thinness and composition to be transparent.

* * * * *